United States Patent [19]
Byers

[11] Patent Number: 4,675,991
[45] Date of Patent: Jun. 30, 1987

[54] METHOD OF ASSEMBLING ELECTRIC STORAGE BATTERIES

[75] Inventor: Robert G. Byers, Anderson, Ind.

[73] Assignee: General Motors Corporation, Detroit, Mich.

[21] Appl. No.: 801,244

[22] Filed: Nov. 25, 1985

[51] Int. Cl.⁴ .................................................. H01M 2/24
[52] U.S. Cl. ................................... 29/623.1; 429/160
[58] Field of Search ......................... 29/623.1; 429/160

[56] References Cited

FOREIGN PATENT DOCUMENTS 1103307 6/1981 Canada .
1533387 11/1978 United Kingdom ............... 429/160
2004410A 3/1979 United Kingdom ............... 429/160

Primary Examiner—Anthony Skapars
Attorney, Agent, or Firm—Lawrence B. Plant

[57] ABSTRACT

Method of assembling an electric storage battery including forming an intercell connector between upstanding battery element lugs, positioning the intercell connector in a notch in a container partition and filling the notch with a plastic material to seal the intercell connector in the notch, the improvement wherein the intercell connector lugs are provided with elastic collars at the roots thereof to prevent leakage of the plastic material at the time the notch is filled.

2 Claims, 5 Drawing Figures

METHOD OF ASSEMBLING ELECTRIC STORAGE BATTERIES

This invention relates to electric storage batteries and more particularly a method for providing a sealed intercell connector therefor.

BACKGROUND OF THE INVENTION

Electric storage batteries comprise essentially a partitioned container having a plurality of compartments each of which contains an electrochemically active cell element immersed in an electrolyte. Each cell element typically comprises a stack of alternating positive and negative polarity plates separated one from the other by a microporous dendrite growth suppressing sheet known as a separator. Each of these plates comprises a conductive current collector having an active material deposited thereon or therein depending on the nature of the battery (e.g., Pb-acid, Ni-Zn, etc.). The current collector supports its associated active material relative to the other plates in the element and conducts electrical current substantially uniformly throughout the plate. The current collectors each have a conductive tab, or the like, projecting therefrom for coupling that current collector to other current collectors from plates of like polarity within the cell element (e.g., for joining the positive polarity plates together). One well known means for electrically connecting the tabs of like polarity plates is a bar of metal, known as a plate strap, cast onto the tabs. Another well known means for connecting the tabs is a simple bundle of several plate tabs gathered together atop the cell element. Each cell element is electrically joined (e.g., in electrical series) through the intercell partition to a cell element in the next adjacent compartment. For this purpose, the plate connecting means (i.e., plate strap or tab bundle) typically includes an upstanding lug which is electrically joined to a similar lug on the adjacent cell element via an intercell connector passing through an aperture in the intercell partition. The intercell connector is sealed within the aperture to prevent leakage of electrolyte between the adjacent compartments. Canadian Pat. No. 1,103,307, for example: positions the intercell connector in a notch formed in the top of the intercell partition; places a mold over the lugs, notch and partition; and injects plastic into the mold to fill the notch, embed the intercell connector and encapsulate the lugs. However, it is not always possible to provide a tight seal between the upstanding lugs and the partition beneath the notch and between the mold and the lugs. Without a tight seal, the injected plastic thereby can squirt into the cell compartment and ruin the battery. The problem of sealing the mold to the lug is particularly acute where the lug is a bundle of plate tabs as any misalignment of the tabs provides an uneven surface along the sides of the lug. The problem is exacerbated even further when one attempts to consistently produce leak-free seals from one battery to the next on an automatic production basis considering the allowable manufacturing of the tolerance parts and the positioning thereof.

Accordingly, it is an object of the present invention to provide an improved, simple, reliable method of sealing the intercell connector and encapsulating the connector lugs on either side of the intercell partition which method substantially consistently eliminates leakage of injected plastic from the intercell connector region over a wide range of manufacturing tolerances.

This and other objects and advantages of the present invention will become more readily apparent from the detailed description thereof which follows.

BRIEF DESCRIPTION OF THE INVENTION

The present invention comprehends a method of forming an intercell connector seal between adjacent cells of an electric storage battery comprising the steps of: providing a container having at least two adjacent cell compartments separated by an intercell partition having a notch in the top edge thereof; positioning cell elements in each of the compartments which elements each include an upstanding lug for connection to a similar lug on the next adjacent cell element via the notch in the partition; positioning a compressible, elastic collar about the root of each of the lugs; positioning the elements in their respective compartment such that the collar abuts the partition beneath the notch; forming an intercell connector between the adjacent lugs through the notch in the partition; positioning a mold over the lugs, collar, notch and surrounding partition and pressing it into sealing engagement therewith such as to compress the collar against the partition beneath the notch and cause it to conform to the shape of the lug root and surrounding mold; and finally injecting plastic into the mold so as to fill the notch, embed the intercell connector in the plastic, encapsulate the lug and bond to the partition defining the notch.

The elastic collar will preferably comprise a tetra-seal having a rectangular, cross-section (though an O-ring is also acceptable) and is positioned about the roots of the lugs before the intercell connector is made. The intercell connector may then be made in a variety of ways either before or after the elements are placed in the compartments. For example, the intercell connector may be formed by simply welding lugs directly to each other or a separate, intermediate piece joined to each lug and bridging the partition through the notch.

DETAILED DESCRIPTION OF A SPECIFIC EMBODIMENT OF THE INVENTION

The invention may better be understood when considered in the light of the following detailed description of a specific embodiment thereof which is given hereafter in conjunction with the several drawings in which.

Figure 1:
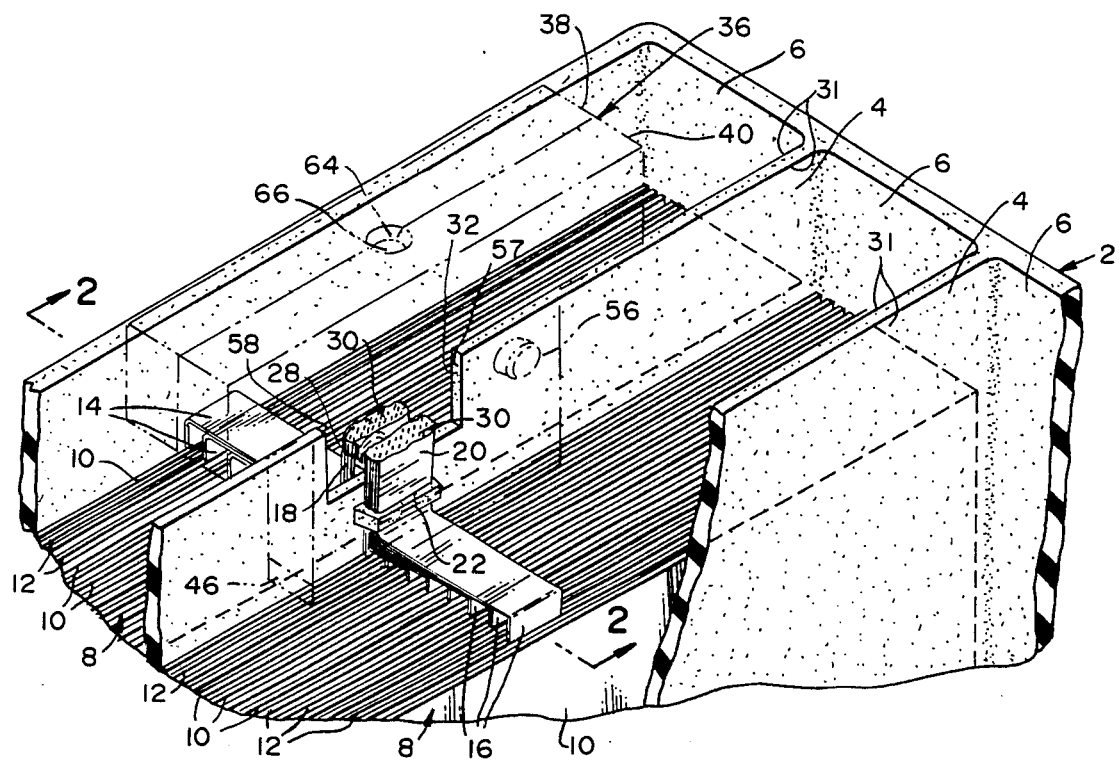
FIG. 1 is a partially sectioned, perspective view of the intercell connector region of a battery before sealing by the process of the present invention.

FIG. 1 shows a battery case 2 having intercell partitions 4 defining individual cell compartments 6 for receiving and retaining cell elements 8 therein. The cell elements 8 comprise a plurality of positive plates 10 (e.g., NiOOH) and alternately spaced negative plates 12 (e.g., Zn). Each of the positive plates 10 have a tab 14 (e.g., Ni Foil) extending therefrom (see FIG. 2) while each of the negative plates 12 have tabs 16 (e.g., Ni Foil) extending therefrom. The several tabs 14 are bundled together to electrically join the several positive plates. Similarly, the several negative plate tabs 16 are bundled together to electrically join the negative plates. Each tab bundle is then bent upwardly to form the positive intercell connector lug 18 and the negative intercell connector lug 20. A rubber tetra-seal type collar 22, having a rectangular cross-section, is positioned over each lug 18 and 20 at the roots 24 and 26 thereof adjacent the bends 23 and 25 where the lugs join the tabs 14 and 16 respectively. A U-shaped, copper intercell connector 28 is positioned between the tips of the lugs 18 and 20 and welded thereto as indicated by the weld nuggets 30. The cell elements 8 are then positioned in their respective compartments 6 such that the intercell connector 28 falls within a notch 32 formed in the intercell partition 4 and the elastic collar 22 abuts the partition 4 at a point 34 just beneath the notch 32.

Figure 2:
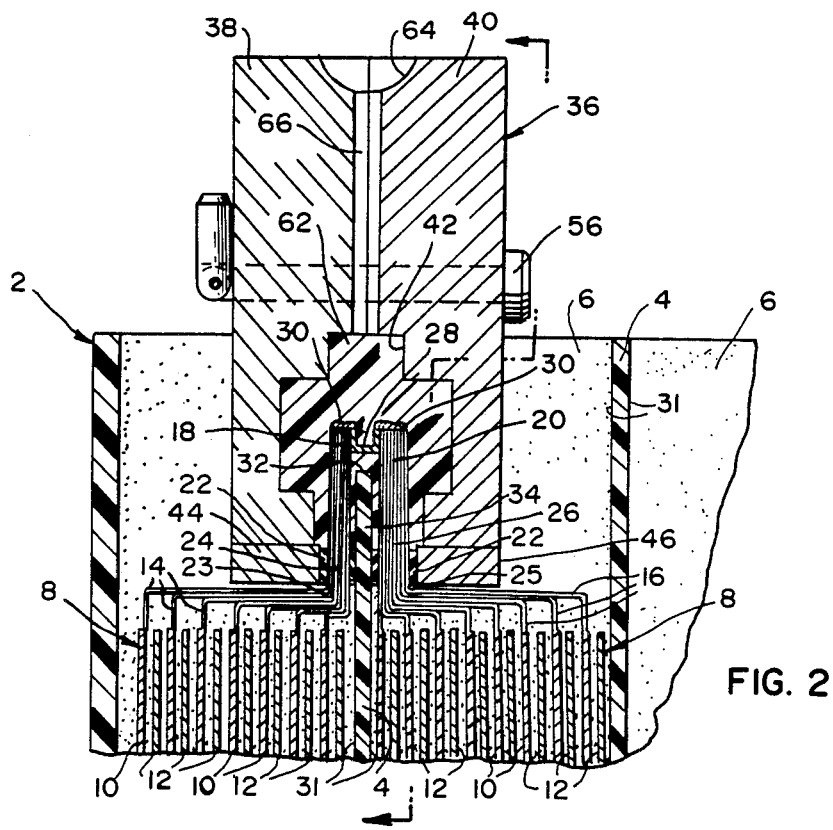
FIG. 2 is a sectioned view in the direction 2—2 of FIG. 1.
Figure 3:
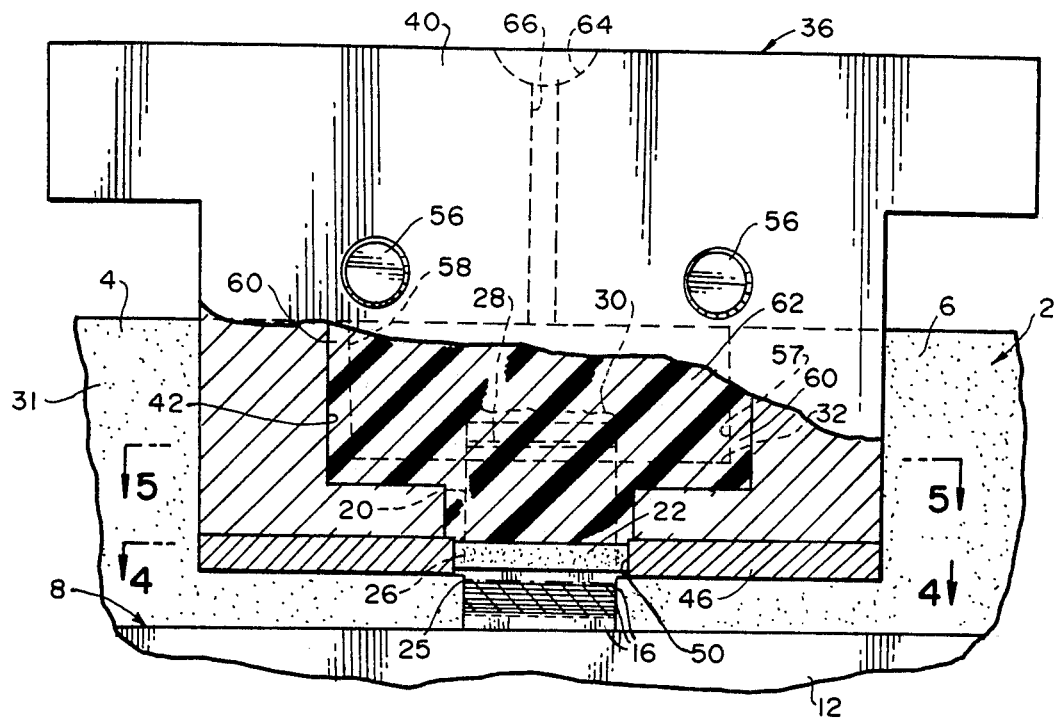
FIG. 3 is a sectioned view in the direction 3—3 of FIG. 2.
Figure 4:
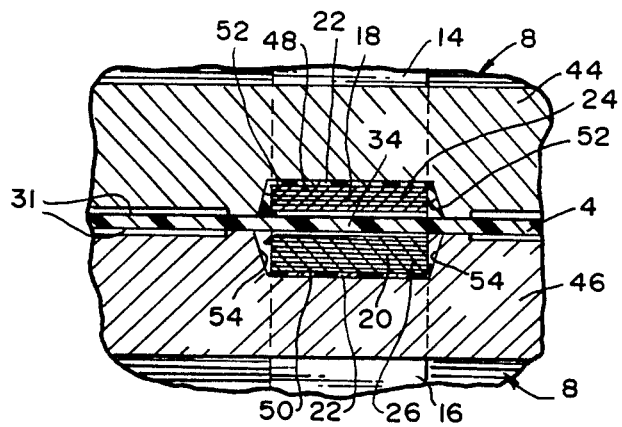
FIG. 4 is a sectioned view in the direction 4—4 of FIG. 3.

After the cell elements 8 have been positioned in the cell compartments a mold 36 comprising mold halves 38 and 40 and defining mold cavity 42 are brought together about the lugs 18 and 20, collar 22 and notch 32 as best shown in FIG. 2. The lower ends of the mold halves 38 and 40 have plates 44 and 46 respectively bolted thereto. The plates 44 and 46 have cutout portions 48 and 50 (see FIG. 4) sized to engage the collar 22 so as to compress it against the intercell partition 4 at point 34 and constrictively about the lugs 18 and 20 to form a tight seal therewith. The cutouts 48 and 50 are beveled as at 52 and 54 respectively for guiding the mold into place and causing the collar 22 to conform tightly to the roots 24 and 26 of the lugs 18 and 20. In this regard, after the mold 36 is positioned about the lugs, in the manner described above, clamping means 56 pulls the mold halves 38 and 40 together into sealing engagement with the faces 31 of the partition 4 surrounding the notch 32 and such as to compress the collar 22 against the partition portion 34 and about the lugs 18 and 20.

Figure 5:
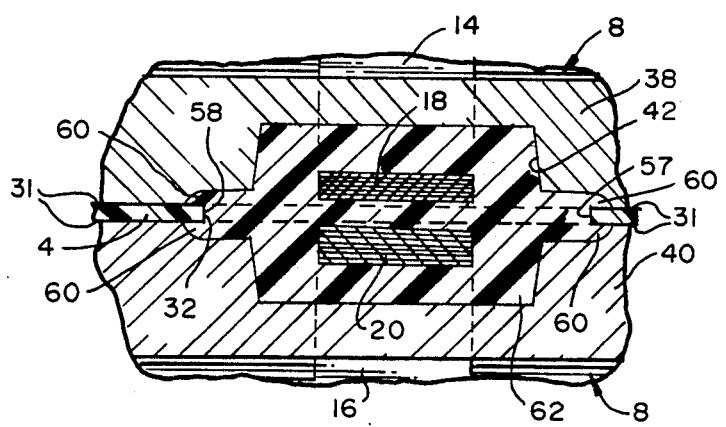
FIG. 5 is a sectioned view in the direction 5—5 of FIG. 3.

As best shown in FIG. 5, the cavity 42 formed between the mold halves 38 and 40 extends slightly beyond the edges 57 and 58 of the aperture 32 so as to provide overlapping portions 60 of the injected plastic material 62. After the mold is positioned, an appropriate plastic material is introduced into the mold cavity 42 via the opening 64 and runner 66. The plastic will preferably be hot injection molded and comprise the same material as the container 2.

Needless to say the intercell connector lugs need not be tab bundles, but rather may be of one-piece construction such as is formed by casting in situ at the time a plate strap is cast to the electrode tabs. Accordingly, while the invention has been described primarily in terms of a specific embodiment thereof it is not intended to be limited thereto but rather only to the extent set forth hereafter in the claims which follow.

The embodiments of the invention in which an exclusive property or privilege is claimed are defined as follows:

1. In the method of assembling an electric storage battery including the principal steps of: providing a container having at least two adjacent cell compartments separated by an intercell partition having a notch therein; positioning a cell element in each said compartment, said element including an upstanding lug adapted for connection to an intercell connector; forming an intercell connector through said notch and between lugs of adjacent cell elements; positioning a mold tightly about said lugs, notch and surrounding partition; and injecting plastic into said mold so as to fill said notch, embed said intercell connector therein, encapsulate said lugs therewith and bond to the partition surrounding the notch the improvement comprising:
   positioning a compressible elastic collar about each said lug;
   positioning said element in said compartment such that one side of said collar abuts said partition beneath said notch; and
   tightly engaging the remaining sides of said collar with said mold while pressing said one side of said collar against said partition so as to completely seal the joints between the lug and the partition and the lug and the mold and thereby substantially prevent said plastic from escaping said mold into said compartment.

2. In the method of assembling an electric storage battery including the principal steps of: providing a container having at least two adjacent cell compartments separated by an intercell partition having a notch therein; positioning a cell element in each said compartment, said element including an upstanding lug adapted for connection to an intercell connector; forming an intercell connector through said notch and between lugs of adjacent cell elements; positioning a mold tightly about said lugs, notch and surrounding partition; and injecting plastic into said mold so as to fill said notch, embed said intercell connector therein, encapsulate said lugs therewith and bond to the partition surrounding the notch, the improvement comprising:
   said element comprising a plurality of positive and negative plates each having a conductive tab extending therefrom for electrically coupling its associated plate with plates of like polarity in the element;
   said lug comprising a bundle of said tabs;
   positioning a compressible elastic collar about each said lug;
   positioning each said element in a said compartment such that (1) the lug of one cell element opposes the lug of the next adjacent cell element across said notch and (2) one side of said collar abuts said partition beneath said notch; and
   tightly engaging the remaining sides of said collar with said mold while pressing said one side of said collar against said partition so as to conform said collar to the outside surface of said bundle and completely seal the joint between the lug and the partition and between the lug and the mold and thereby substantially prevent said plastic from escaping said mold into said compartment.

* * * * *